No. 875,263. PATENTED DEC. 31, 1907.
A. HERTWIG.
RIVETED JOINT.
APPLICATION FILED NOV. 29, 1905.
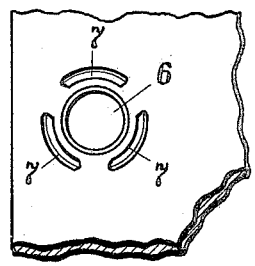
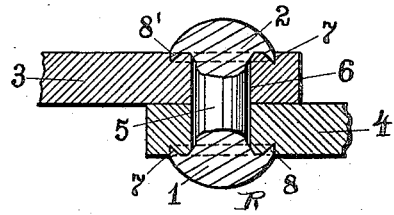
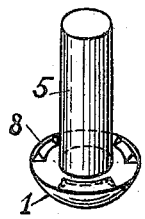
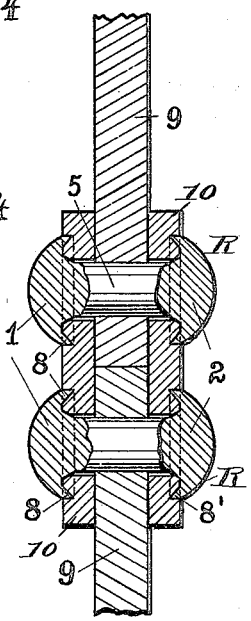
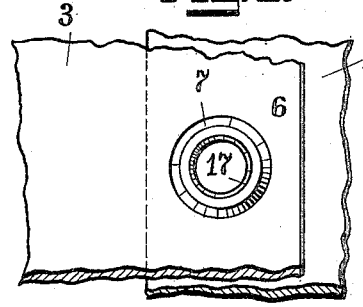
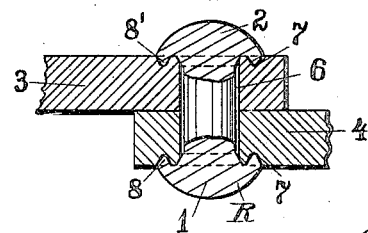
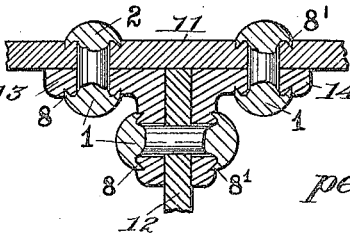
Witnesses.
Adolf Frank.
Jos. Schnitzler.
Inventor.
August Hertwig
per Martin Schmetz
Attorney.
THE NORRIS PETERS CO., WASHINGTON, D. C.

UNITED STATES PATENT OFFICE.

AUGUST HERTWIG, OF AIX-LA-CHAPELLE, GERMANY.

RIVETED JOINT.

No. 875,263.  Specification of Letters Patent.  Patented Dec. 31, 1907.

Application filed November 29, 1905. Serial No. 289,697.

*To all whom it may concern:*

Be it known that I, AUGUST HERTWIG, professor in the Royal Polytechnicum at Aix-la-Chapelle, Germany, a subject of the King of Prussia, residing at Aix-la-Chapelle, No. 79 Nizzaallee, in the Kingdom of Prussia, Empire of Germany, have invented certain new and useful Improvements in Riveted Joints; and I do hereby declare the following to be a full, clear, and exact description of the invention, such as will enable others skilled in the art to which it appertains to make and use the same.

My present invention relates to riveted joints and the object in view is to produce riveted joints which shall possess a far higher and better safeguarded sliding resistance and a higher degree of tightness, than any of the riveted joints now in use. This improved riveted joint is particularly well adapted for structures exposed to rough usage, such as railway and other bridges, cranes and the like, also for structures wherein great strength of the joint must be accompanied by a very high degree of tightness, as for instance in boilers, reservoirs and similar structures, in short, it is adapted for any structural work wherein a strong and reliable union of the several parts of construction is desirable.

In the accompanying drawing:—Figure 1 is a sectional view of a lap joint. Fig. 2 is a plan view of parts of lap joint plates, of which one shows a rivet hole and an annular recess for the reception of an annular projection upon the flat inner surface of the rivet-head. Fig. 3 is a view similar to Fig. 1 and shows a modification of the rivet-heads. Fig. 4 is a plan view of a plate which shows a number of independent recesses for the reception of projections formed upon the flat inner surface of the head of a modified form of the rivet. Fig. 5 is a cross-sectional view of butt joint according to my present invention. Fig. 6 is a sectional view of a union of two plates meeting at right angles. Fig. 7 is a perspective view of a modification of the projection on the rivet-head.

To form a lap joint according to my present invention the plates 3 and 4 to be united are drilled in any suitable manner and the rivet-hole 6 thus formed more or less countersunk to best suit the end in view. Into the outer face of each of the plates to be united a recess 7 is sunk for the reception of a correspondingly shaped annular projection 8 arranged upon the flat inner surface of the rivet-head. If now the shank 5 of the rivet R is introduced into the rivet-hole 6 which is of a larger diameter than the diameter of the rivet-shank, and then the tail of the rivet swaged down to form the head 2, the annular projection 8 initially formed with the rivet-head 1 will enter into and completely fill the head 1 will enter into and completely fill the recess 7 of the plate 4, and the annular projection $8^1$, formed during the time the tail of the rivet is swaged down, will enter into and completely fill the recess 7 of the plate 3. After the rivet R has been closed frictional resistance is set up between the rivet-heads and the plates on the one hand, and between the plates themselves on the other hand. If a joint thus riveted is put under stress so that the plate 3 is pulled in one direction and the plate 4 in the opposite direction, a tendency to tilt is created in the rivet R with the result that the joint is all the more tighter closed the greater said stress is. This favorable action of the rivet is greatly enhanced by the fact that its shank 5 does not completely fill the rivet-hole 6, and the practical results of this action are, that the difficult and expensive calking can be dispensed with, the sliding resistance is protected against vibrations, and a sliding between the rivet-heads and plates is made impossible.

The cross-section of the annular projections 8 and $8^1$ may be varied to suit the ends in view. Where an exceedingly high degree of tightness of joint is required the cross section of the projections 8 and $8^1$ as well as the cross-section of the recesses 7 for their reception should be of wedge-shaped form, because the wedge action creates the most intimate contact between the rivet-head and its support.

Instead of giving the projections 8 and $8^1$ an annular shape they may consist of several independent parts or divisions preferably arranged on a circle as indicated in Fig. 7. It is evident that in cases where this modified form of this rivet R is employed the annular recess 7 shown in Fig. 2 should be divided up into a plurality of divisions which correspond in number and shape with the projections arranged upon the flat under surface of the rivet-head.

Fig. 5 represents a butt joint according to my present invention. Here the shanks 5 of the rivets R completely fill the holes of the middle-plates 9 but not to the rivet-holes of the cover-plates 10. If in this joint the plates 9 are put under stress the heads of the rivets here placed in double shear will act in a similar manner as the heads of the rivets of the lap joint.

In Fig. 6 a practical application of the present invention to structural work is given. In this example the plate 11 is to be connected with the plate 12 at right angles, to which end the two angle-irons 13 and 14 are secured by means of the single shear rivets to the plate 11 and by means of double shear rivets to the plate 12. In this example also the feature of this invention, that the shanks of the rivets do not fill the rivet holes of such parts of the joints on which the rivet-heads are formed, is plainly apparent.

I claim:—

1. A riveted joint comprising metallic parts provided with rivet-holes in register and having a recess adjacent each of said rivet-holes, a rivet provided with heads having a flat inner surface each, and a projection upon said flat inner surface of each of said rivet-heads for filling said recesses to increase and safeguard the sliding resistance and the tightness of the joint.

2. A riveted joint comprising metallic parts provided with countersunk rivet-holes in register, said parts provided with a recess in each and independent of the countersink of each rivet hole, a rivet provided with a shank of a lesser diameter than said rivet-holes and with heads each having a flat inner surface, and a projection upon said flat inner surface of each of said rivet-heads for filling said recesses to increase and safeguard the sliding resistance and the tightness of the joint.

3. A riveted joint comprising metallic parts provided with countersunk rivet-holes in register, said parts provided with a plurality of recesses in each and independent of the countersink of each rivet hole, a rivet provided with a shank of a lesser diameter than said rivet holes and with heads each having a flat inner surface, and a plurality of projections upon said flat inner surface of each of said rivet-heads for filling said recesses to increase and safeguard the sliding resistance and the tightness of the joint.

4. A riveted joint comprising a plurality of external metallic parts and an internal metallic part provided with rivet holes in register of which those of said external parts are countersunk, said external parts provided with a recess in each and independent of the countersink of each rivet-hole in said external parts, a rivet provided with a shank of lesser diameter than the rivet-holes in said external parts and of the same diameter as the hole of said internal part and provided with heads each having a flat inner surface, and a projection upon said flat inner surface of each of said rivet-heads for filling said recesses to increase and safeguard the sliding resistance and the tightness of the joint.

In testimony whereof I have signed my name to this specification in the presence of two subscribing witnesses.

AUGUST HERTWIG.

Witnesses:
HENRY QUADFLIEG,
FRANK DILLINGHAM.